(12) United States Patent
Yashiki et al.

(10) Patent No.: US 10,164,294 B2
(45) Date of Patent: Dec. 25, 2018

(54) SEPARATOR CORE AND SEPARATOR ROLL

(71) Applicant: Sumitomo Chemical Company, Limited, Tokyo (JP)

(72) Inventors: Daizaburo Yashiki, Niihama (JP); Daijiro Hoshida, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/654,946

(22) Filed: Jul. 20, 2017

(65) Prior Publication Data

US 2018/0026309 A1    Jan. 25, 2018

(30) Foreign Application Priority Data

Jul. 21, 2016 (JP) .................. 2016-143454
May 10, 2017 (JP) .................. 2017-093854

(51) Int. Cl.
| | |
|---|---|
| *H01M 10/0587* | (2010.01) |
| *H01M 2/14* | (2006.01) |
| *B65H 75/10* | (2006.01) |
| *H01M 2/16* | (2006.01) |
| *H01M 2/18* | (2006.01) |
| *H01M 4/13* | (2010.01) |
| *H01M 10/04* | (2006.01) |
| *H01M 10/052* | (2010.01) |
| *H01M 10/0567* | (2010.01) |

(52) U.S. Cl.
CPC ........ *H01M 10/0587* (2013.01); *B65H 75/10* (2013.01); *H01M 2/14* (2013.01);
(Continued)

(58) Field of Classification Search
CPC .............. B65H 75/10; B65H 2401/115; B65H 2701/1752; B65H 2701/5122; B65H 2701/534; B65H 2701/535; B65H 75/18; B65H 75/02; B65H 75/08; H01M 2/145; H01M 2/18; H01M 10/049; H01M 10/052; H01M 10/0567; H01M 10/0587; H01M 2/14; H01M 2/168; H01M 4/13
See application file for complete search history.

(56) References Cited

U.S. PATENT DOCUMENTS

| | | |
|---|---|---|
| 2011/0262814 A1 | 10/2011 | Ikemoto et al. |
| 2014/0170463 A1 | 6/2014 | Kanemoto et al. |
| 2014/0322585 A1 | 10/2014 | Iizuka et al. |

FOREIGN PATENT DOCUMENTS

| | | |
|---|---|---|
| CN | 103887463 A | 6/2014 |
| JP | 5077528 U | 7/1975 |

(Continued)

OTHER PUBLICATIONS

Office Action dated May 8, 2018 in JP Application No. 2017-093854 (Partial English Translation).

(Continued)

*Primary Examiner* — Kenneth J Douyette
*Assistant Examiner* — Heng M. Chan
(74) *Attorney, Agent, or Firm* — Panitch Schwarze Belisario & Nadel LLP

(57) ABSTRACT

A core (u1, u2) around which a nonaqueous electrolyte secondary battery separator is to be wound. A side surface of the core (u1, u2) has a depression (20). This makes it possible, in a case where cores (separator cores) are stored by being stacked while still wet after cleaning, to prevent damage to a core caused by a problem where cores stick together and an core lower in a stack falls when a core higher in the stack is removed.

5 Claims, 11 Drawing Sheets

(52) U.S. Cl.
CPC ............ *H01M 2/145* (2013.01); *H01M 2/168* (2013.01); *H01M 2/18* (2013.01); *H01M 4/13* (2013.01); *H01M 10/049* (2013.01); *H01M 10/052* (2013.01); *H01M 10/0567* (2013.01); *B65H 2401/115* (2013.01); *B65H 2701/5122* (2013.01); *B65H 2701/534* (2013.01); *B65H 2701/535* (2013.01)

(56) References Cited

FOREIGN PATENT DOCUMENTS

| | | | |
|---|---|---|---|
| JP | 6186367 U | | 6/1986 |
| JP | H05-101525 A | | 4/1993 |
| JP | 3018111 U | | 11/1995 |
| JP | 2008-189379 A | | 8/2008 |
| JP | 3167815 | * | 4/2011 |
| JP | 3167815 U | | 5/2011 |
| JP | 2013-139340 A | | 7/2013 |
| JP | 5683078 B2 | | 3/2015 |
| KR | 20110089438 A | | 8/2011 |
| KR | 20140102242 A | | 8/2014 |

OTHER PUBLICATIONS

Office Action dated Aug. 10, 2017 in KR Application No. 2017-0041678.
Office Action dated Jul. 31, 2018 in JP Application No. 2017093854 (Partial Translation).
Office Action dated Aug. 17, 2018 in CN Application No. 201710599066.0.

* cited by examiner

FIG. 9

|  | Depression area ratio | Angle of slippage commencement (degrees) | Vertical separation strength (N) |
|---|---|---|---|
|  |  | Average, N=10 | Average, N=5 |
| Sample 1 (Comparative example) | 0% | 41.7 | 3.53 |
| Sample 2 | 3.9% | 35.1 | 3.06 |
| Sample 3 | 7.7% | 34.9 | 2.87 |
| Sample 4 | 14.8% | 29.9 | 2.02 |
| Sample 5 | 29.7% | 26.0 | 1.39 |

SEPARATOR CORE AND SEPARATOR ROLL

This Nonprovisional application claims priority under 35 U.S.C. § 119 on Patent Application No. 2016-143454 filed in Japan on Jul. 21, 2016, and on Patent Application No. 2017-093854 filed in Japan on May 10, 2017, the entire contents of both of which are hereby incorporated by reference.

TECHNICAL FIELD

The present invention relates to (i) a separator core around which a separator for a nonaqueous electrolyte secondary battery (hereinafter referred to as a "nonaqueous electrolyte secondary battery separator") is to be wound and (ii) a separator roll including a separator core and a nonaqueous electrolyte secondary battery separator wrapped around the separator core.

BACKGROUND ART

A separator used in a lithium-ion battery is provided for a lithium-ion battery production process in the form of a separator roll. Such a separator roll is constituted by a long separator sheet wound around a separator core (core). In the lithium-ion battery production process, the long separator sheet is used as a separator after being cut to a predetermined length.

There have been many proposed configurations for preventing damage to the long separator sheet during transportation or storage of the separator roll, in which separator roll the long separator sheet is wound around a core.

For example, Patent Literature 1 discloses an assembly in which (i) a core rod extends through a core of a separator roll and (ii) protectors for protecting the separator roll are provided at both ends of the core rod.

Using the protector disclosed in Patent Literature 1 makes it possible to prevent damage to a long separator sheet during transportation or storage of the separator roll in which the long separator sheet is wound around a core.

CITATION LIST

Patent Literature

[Patent Literature 1]
Japanese Patent No. 5683078 (Registry date: Jan. 23, 2015)

SUMMARY OF INVENTION

Technical Problem

The separator core (core) of a separator roll can affect the quality of a long separator sheet, i.e., a separator, wound therearound.

For example, in a case where a core has a foreign object is adhered thereto or is significantly damaged, winding defects may occur in winding a long separator sheet therearound. Such winding defects include transference of the foreign object from the core to the long separator sheet and the occurrence of wrinkling in the long separator sheet.

For reasons such as these, a core which is to be repeatedly reused requires comparatively rigorous cleaning and storage.

However, while there have been a number of proposed configurations, such as that of Patent Literature 1, for preventing damage to the long separator sheet during transportation or storage of the separator roll in which the long separator sheet is wound around a core, there has not been much research carried out to develop a separator core (core) in which separator core damage and the like does not easily occur in storage thereof, specifically after the core has been cleaned for reuse but before a long separator sheet is wound around the core.

The present invention has been made in view of the above problem. An object of the present invention lies in providing a separator core (core) which makes it possible, in a case where, for example, separator cores (cores) are stored by being stacked while still wet after cleaning, to prevent damage to a core which is caused by a problem where cores stick together and a core lower in a stack falls when a core higher in the stack is removed.

Solution to Problem

In order to solve the above problem, a separator core in accordance with an aspect of the present invention is a separator core around which a nonaqueous electrolyte secondary battery separator is to be wound, in which: a side surface of the separator core has a depression.

With the above configuration, a side surface of the separator core has a depression. This makes it possible to prevent separator cores from sticking to each other, even in a case where, for example, after cleaning of the separator cores, the separator cores are stacked such that respective side surfaces thereof are in mutual contact.

Advantageous Effects of Invention

An aspect of the present invention makes it possible, in a case where, for example, separator cores (cores) are stored by being stacked while still wet after cleaning, to prevent damage to a core which is caused by a problem where cores stick together and a core lower in a stack falls when a core higher in the stack is removed.

Figure 4:
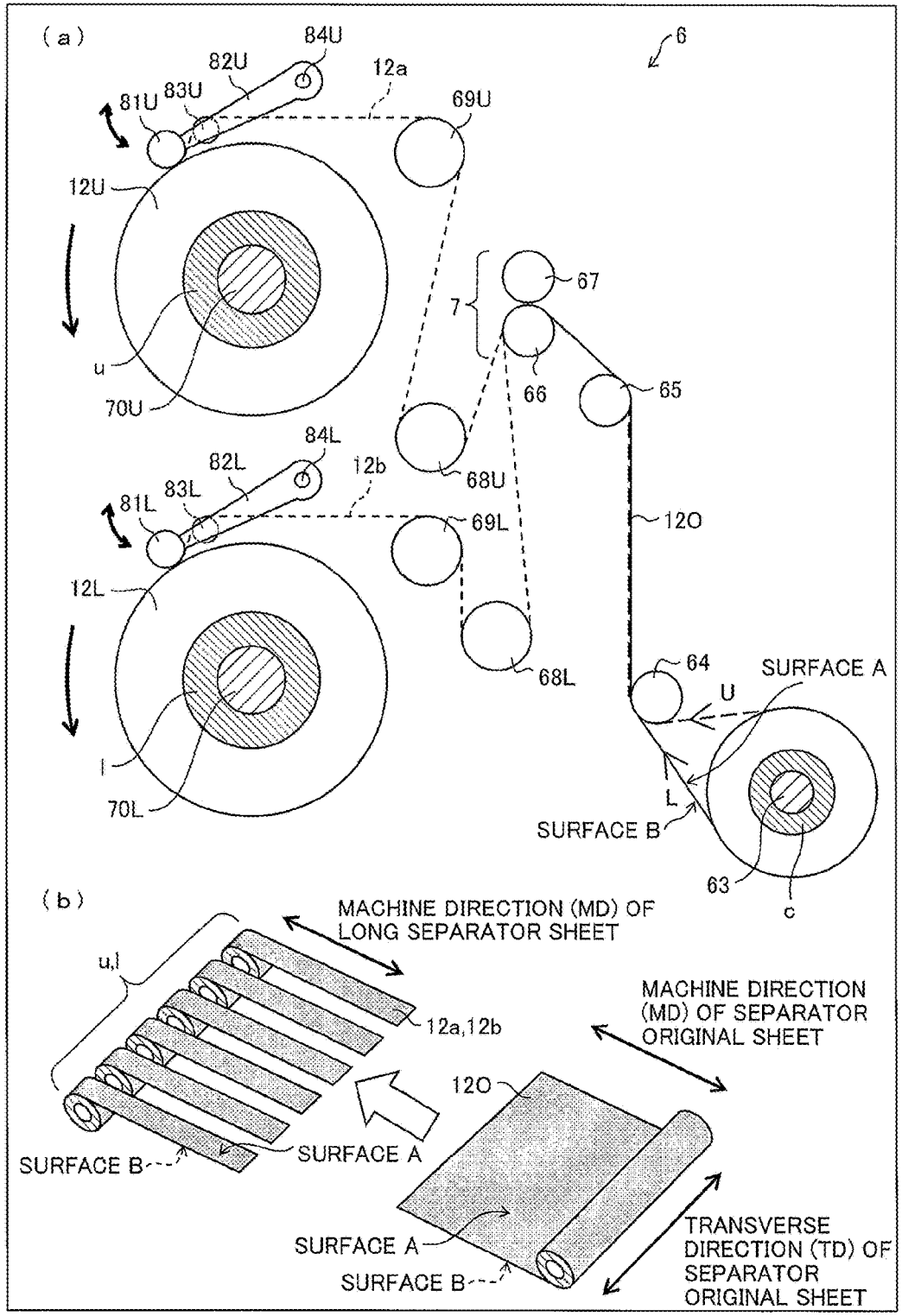

(a) of FIG. 4 is a schematic view illustrating a configuration of a slitting apparatus for slitting a separator original sheet, and (b) of FIG. 4 is a view illustrating a state in which the separator original sheet is slit into a plurality of long separator sheets by the slitting apparatus.

Figure 5:
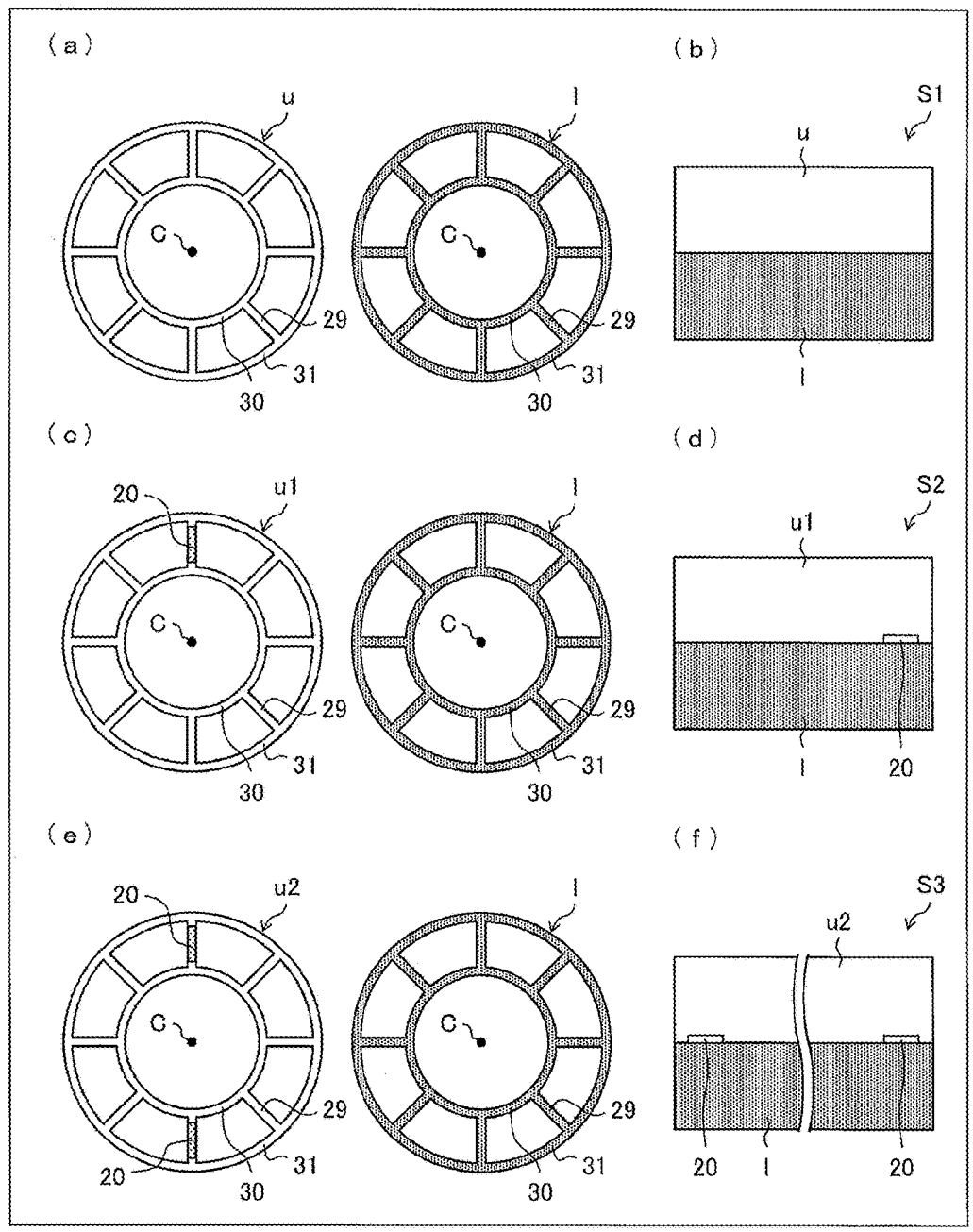

FIG. 5 provides diagrams illustrating examples of side surface shapes of the core and examples of cases where cores are stacked such that respective side surfaces thereof are in mutual contact.

Figure 6:
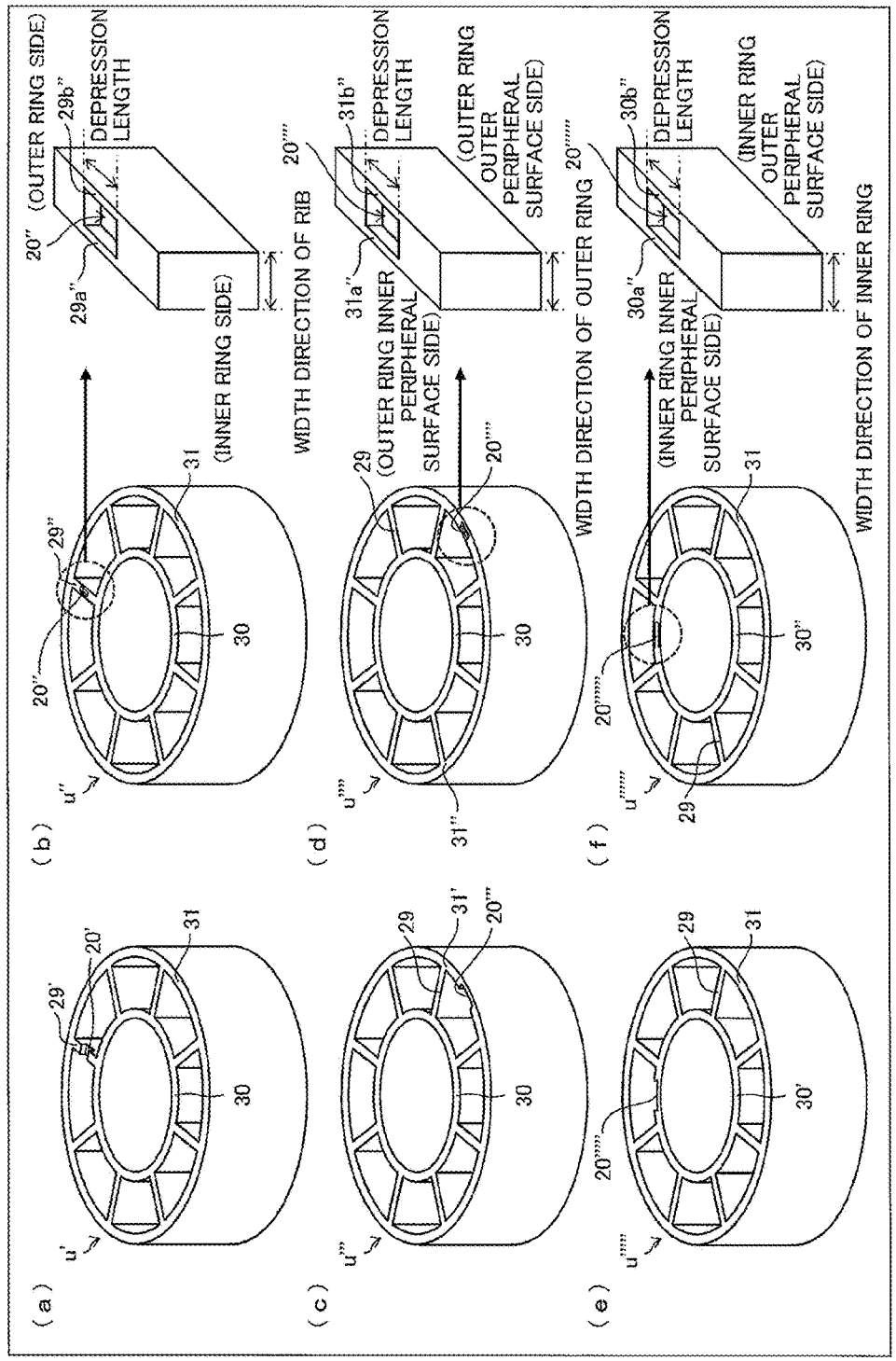

FIG. 6 provides diagrams illustrating examples of depressions which can be provided in the core.

Figure 7:
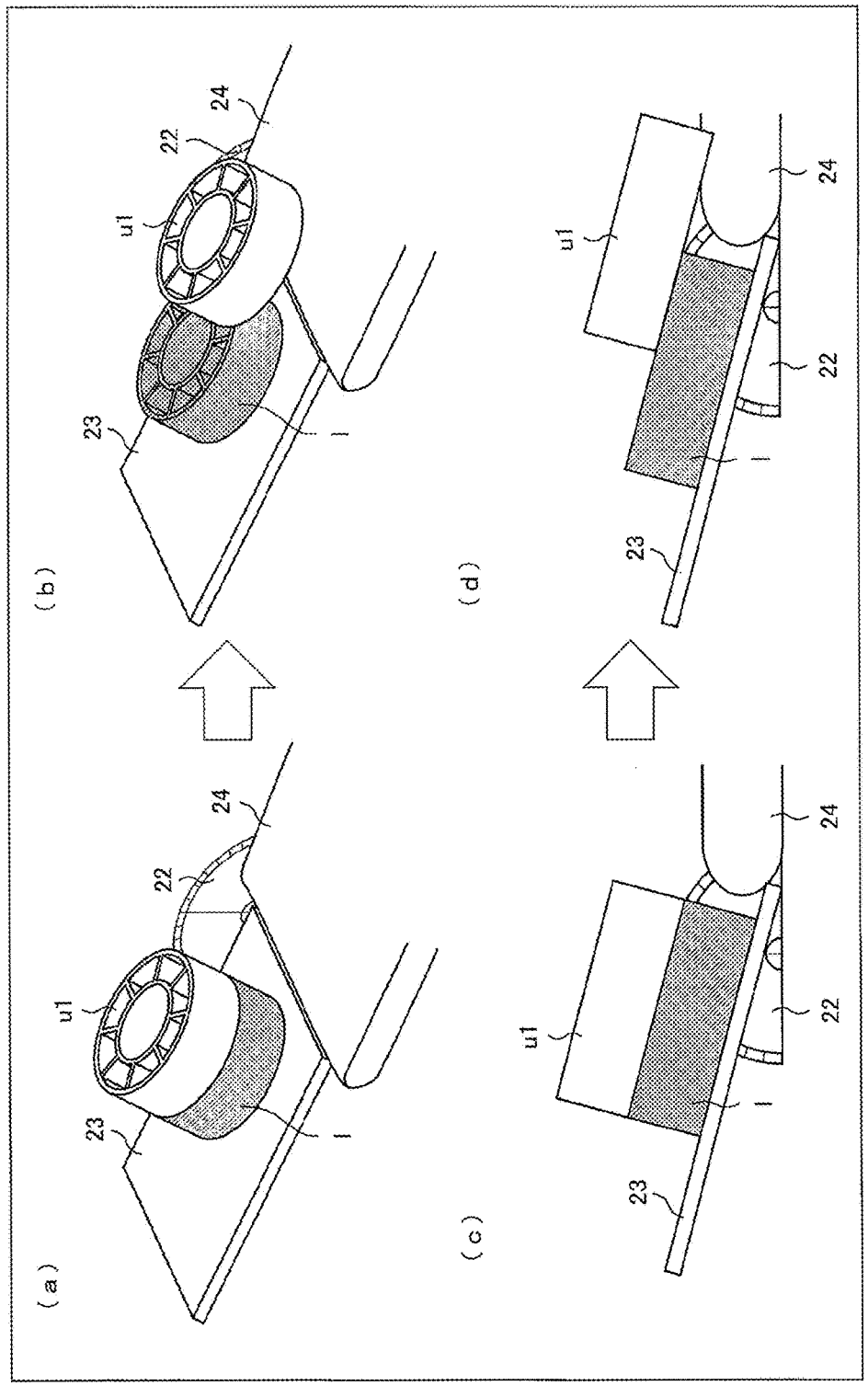

FIG. 7 provides diagrams for explaining a method of slippage testing of stacked cores.

Figure 8:
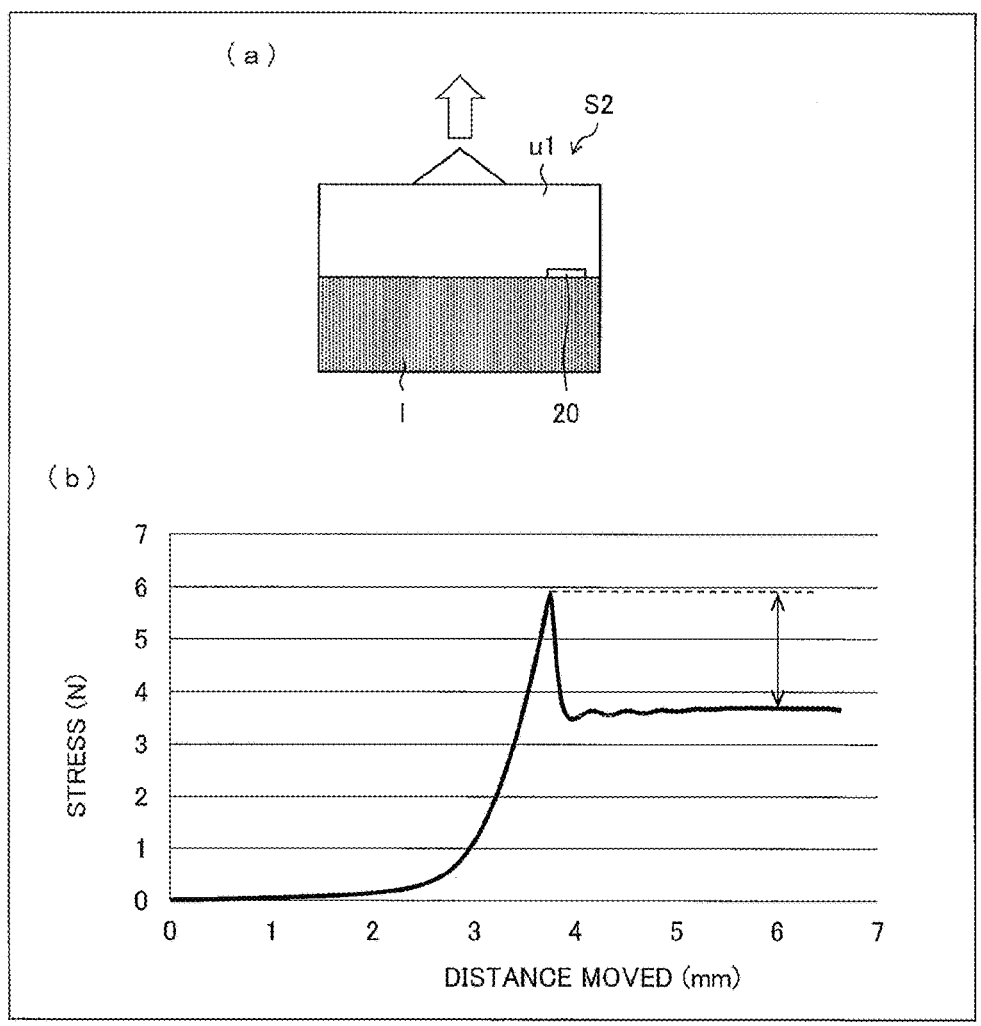

FIG. 8 provides diagrams for explaining a method for vertical separation testing of stacked cores.

FIG. 9 indicates results of slippage testing and vertical separation testing in which the area of a depression differed (that is, in which the area of contact differed).

Figure 10:
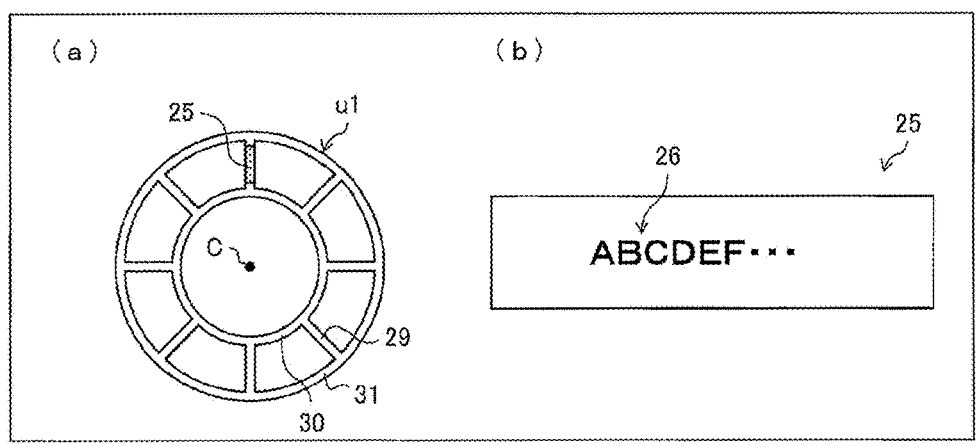

(a) of FIG. 10 illustrates a core having a side surface in which a depression is provided, the depression including an imprinted portion. (b) of FIG. 10 illustrates the depression including the imprinted portion.

Figure 11:
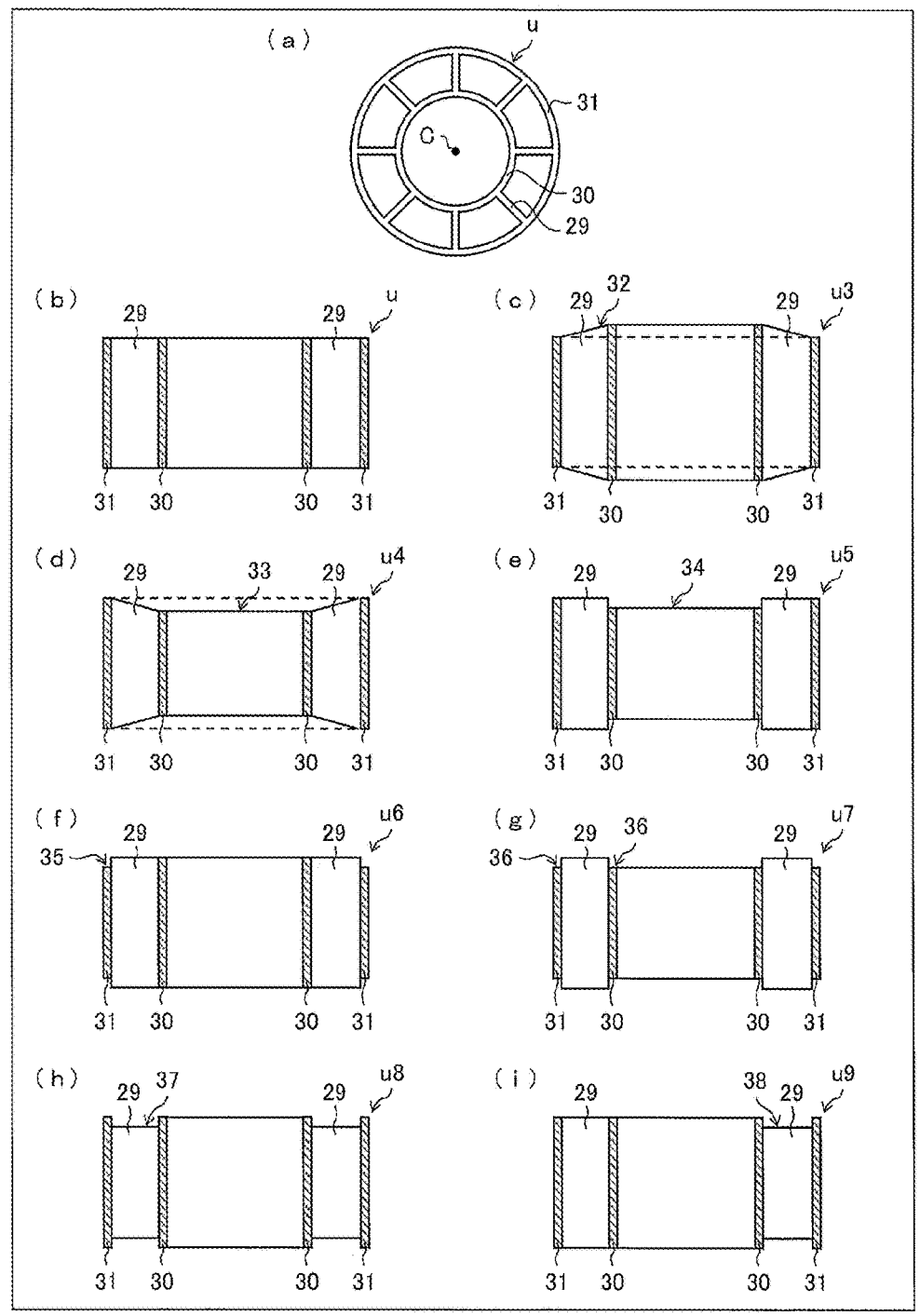

(a) and (b) of FIG. 11 each illustrate an example of a core used in Embodiments in 1 and 2. (c) through (i) of FIG. 11 each illustrate an example of a core used in Embodiment 3.

DESCRIPTION OF EMBODIMENTS

[Basic Configuration]

The following description will discuss in order a lithium-ion secondary battery, a separator, a heat resistant separator, and a method for producing the heat resistant separator.

(Lithium-Ion Secondary Battery)

A nonaqueous electrolyte secondary battery, typically, a lithium-ion secondary battery has a high energy density, and therefore, currently widely used not only as batteries for use in devices such as personal computers, mobile phones, and mobile information terminals, and for use in moving bodies such as automobiles and airplanes, but also as stationary batteries contributing to stable power supply.

Figure 1:
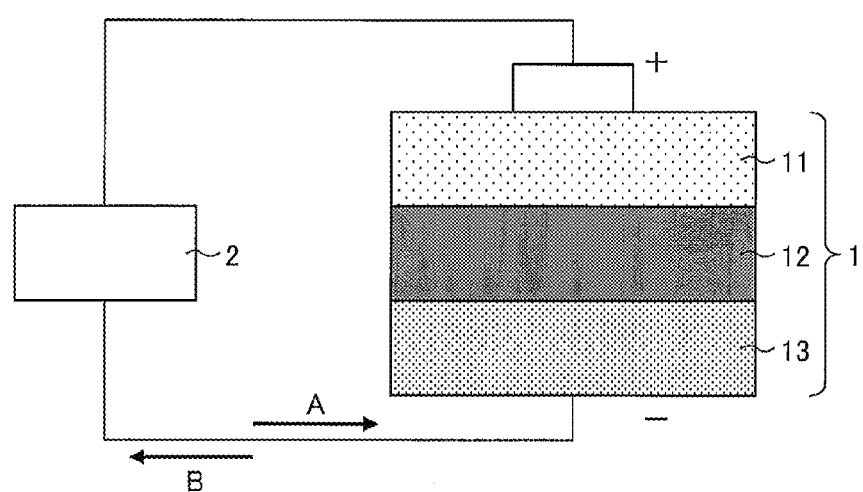
FIG. 1 is a schematic view illustrating a cross sectional configuration of a lithium-ion secondary battery.

FIG. 1 is a diagram schematically illustrating a cross sectional configuration of a lithium-ion secondary battery 1.

As illustrated in FIG. 1, the lithium-ion secondary battery 1 includes a cathode 11, a separator 12, and an anode 13. Between the cathode 11 and the anode 13, an external device 2 is connected outside the lithium-ion secondary battery 1. While the lithium-ion secondary battery 1 is being charged, electrons move in a direction A. On the other hand, while the lithium-ion secondary battery 1 is being discharged, electrons move in a direction B.

(Separator)

The separator 12 is provided so as to be sandwiched between the cathode 11 which is a positive electrode of the lithium-ion secondary battery 1 and the anode 13 which is a negative electrode of the lithium-ion secondary battery 1. The separator 12 is a porous film that separates the cathode 11 and the anode 13, allowing lithium ions to move between the cathode 11 and the anode 13. The separator 12 contains, for example, polyolefin such as polyethylene or polypropylene as a material. Such a separator is also called a polyolefin porous base material.

Figure 2:
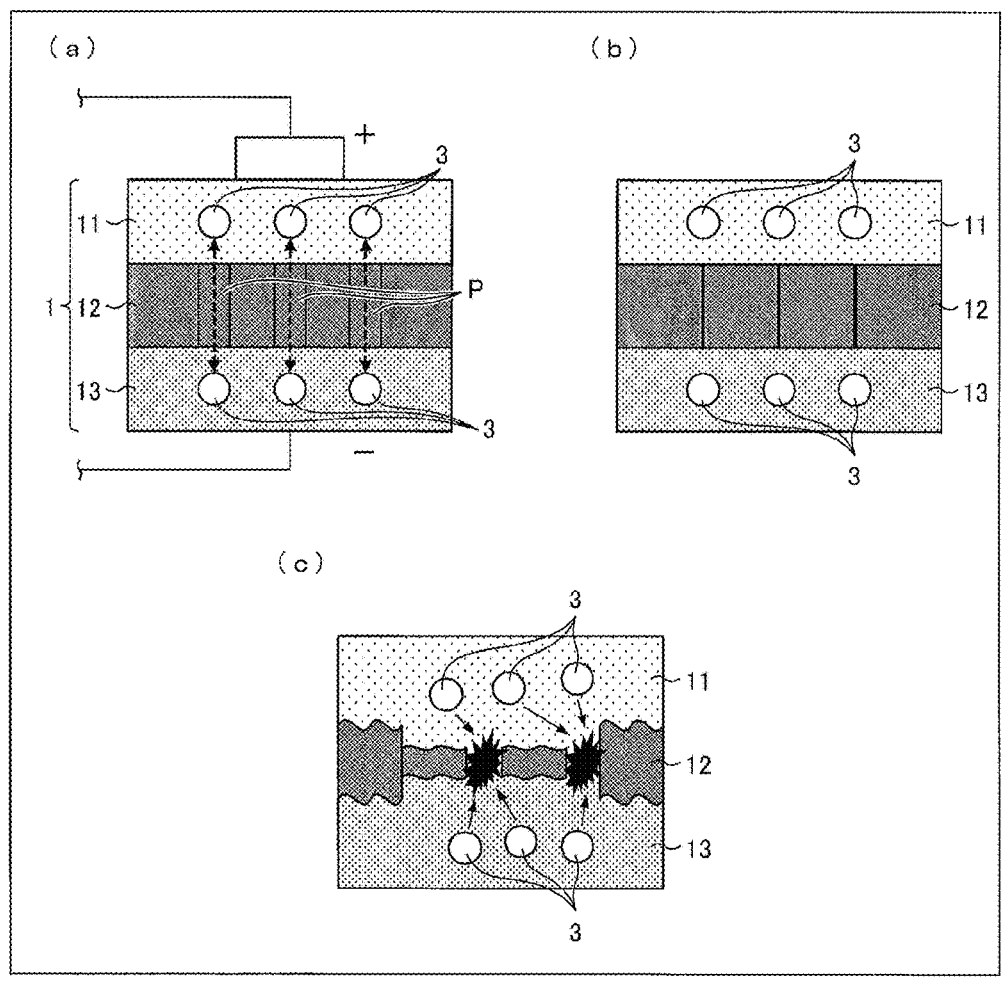
FIG. 2 provides schematic views illustrating details of the configuration of the lithium-ion secondary battery illustrated in FIG. 1.

FIG. 2 provides schematic views illustrating details of the configuration of the lithium-ion secondary battery 1 illustrated in FIG. 1. (a) of FIG. 2 illustrates a normal configuration. (b) of FIG. 2 illustrates a state in which a temperature of the lithium-ion secondary battery 1 has risen. (c) of FIG. 2 illustrates a state in which a temperature of the lithium-ion secondary battery 1 has sharply risen.

As illustrated in (a) of FIG. 2, the separator 12 is provided with many pores P. Normally, lithium ions 3 in the lithium-ion secondary battery 1 can move back and forth through the pores P.

Here, there are, for example, cases in which the temperature of the lithium-ion secondary battery 1 rises due to excessive charging of the lithium-ion secondary battery 1, a high current caused by short-circuiting of the external device, or the like. In such cases, the separator 12 melts or softens and the pores P are blocked as illustrated in (b) of FIG. 2. As a result, the separator 12 shrinks. This stops the movement of the lithium ions 3, and consequently stops the above described temperature rise.

However, in a case where a temperature of the lithium-ion secondary battery 1 sharply rises, the separator 12 suddenly shrinks. In this case, as illustrated in (c) of FIG. 2, the separator 12 may be destroyed. Then, the lithium ions 3 leak out from the separator 12 which has been destroyed. As a result, the lithium ions 3 do not stop moving. Consequently, the temperature continues rising.

(Heat Resistant Separator)

Figure 3:
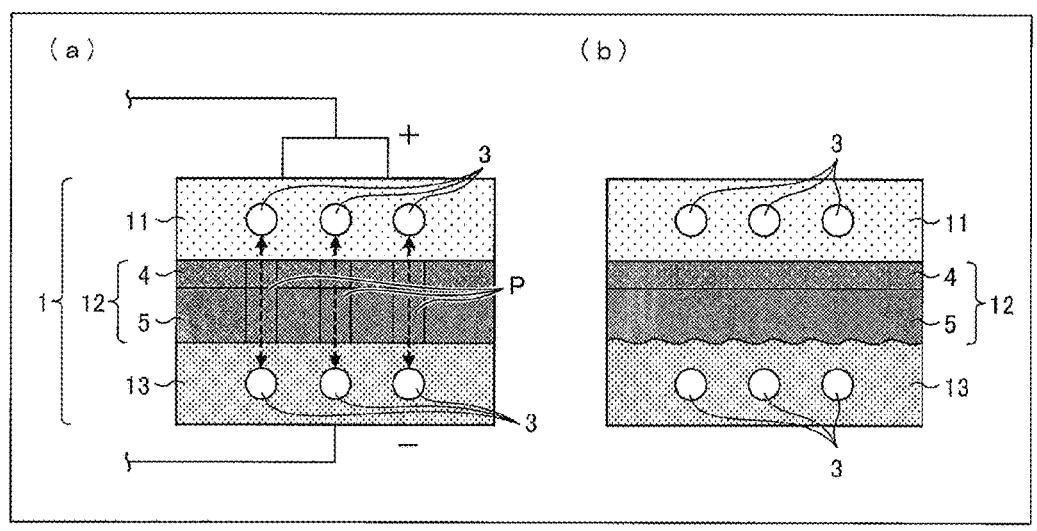
FIG. 3 provides schematic views illustrating another configuration of the lithium-ion secondary battery illustrated in FIG. 1.

FIG. 3 provides schematic views illustrating another configuration of the lithium-ion secondary battery 1 illustrated in FIG. 1. (a) of FIG. 3 illustrates a normal configuration, and (b) of FIG. 3 illustrates a state in which a temperature of the lithium-ion secondary battery 1 has sharply risen.

As illustrated in (a) of FIG. 3, the separator 12 can be a heat resistant separator that includes a porous film 5 and a heat resistant layer 4. The heat resistant layer 4 is laminated on a surface of the porous film 5 which surface is on a cathode 11 side. Note that the heat resistant layer 4 can alternatively be laminated on a surface of the porous film 5 which surface is on an anode 13 side, or both surfaces of the porous film 5. Further, the heat resistant layer 4 is provided with pores which are similar to the pores P. Normally, the lithium ions 3 move through the pores P and the pores of the heat resistant layer 4. The heat resistant layer 4 contains, for example, wholly aromatic polyamide (aramid resin) as a material.

As illustrated in (b) of FIG. 3, even in a case where the temperature of the lithium-ion secondary battery 1 sharply rises and as a result, the porous film 5 melts or softens, the shape of the porous film 5 is maintained because the heat resistant layer 4 supports the porous film 5. Therefore, such a sharp temperature rise results in only melting or softening of the porous film 5 and consequent blocking of the pores P. This stops movement of the lithium ions 3 and consequently stops the above-described excessive discharging or excessive charging. In this way, the separator 12 can be prevented from being destroyed.

The heat resistant separator having the heat resistant layer 4 as illustrated in FIG. 3 is classified as a laminated separator. Other examples of a laminated separator include a separator which includes, instead of the heat resistant layer 4, a porous layer such as an adhesive layer or a protective layer.

(Steps of Producing Heat-Resistant Separator which is a Laminated Separator)

How to produce the heat resistant separator of the lithium-ion secondary battery 1 is not specifically limited. The heat resistant separator can be produced by a well-known method. The following discussion assumes a case where the porous film 5 contains polyethylene as a main material. However, even in a case where the porous film 5 contains another material, the similar steps can still be applied to production of the separator 12.

For example, it is possible to employ a method including the steps of first forming a film by adding a plasticizer to a thermoplastic resin, and then removing the plasticizer with an appropriate solvent. For example, in a case where the porous film 5 is made of a polyethylene resin containing ultra-high molecular weight polyethylene, it is possible to produce the porous film 5 by the following method.

This method includes (1) a kneading step of obtaining a polyethylene resin composition by kneading a ultra-high molecular weight polyethylene and an inorganic filler such as calcium carbonate, (2) a rolling step of forming a film with the polyethylene resin composition, (3) a removal step of removing the inorganic filler from the film obtained in the step (2), and (4) a stretching step of obtaining the porous film 5 by stretching the film obtained in the step (3).

In the removal step, many fine pores are provided in the film. The fine pores of the film stretched in the stretching step become the above-described pores P. The porous film 5 formed as a result is a polyethylene microporous film having a predetermined thickness and a predetermined air permeability.

Note that, in the kneading step, 100 parts by weight of the ultra-high molecular weight polyethylene, 5 parts by weight to 200 parts by weight of a low molecular weight polyolefin having a weight-average molecular weight of 10000 or less, and 100 parts by weight to 400 parts by weight of the inorganic filler can be kneaded.

Subsequently, in a coating step, the heat resistant layer 4 is formed on a surface of the porous film 5. For example, on the porous film 5, an aramid/NMP (N-methylpyrrolidone) solution (coating solution) is applied, and thereby the heat resistant layer 4 that is an aramid heat resistant layer is formed. The heat resistant layer 4 can be provided on only one surface or both surfaces of the porous film 5. Alternatively, for coating, the heat resistant layer 4 can be formed by using a mixed solution containing a filler such as alumina/carboxymethyl cellulose.

A method for coating the porous film 5 with a coating solution is not specifically limited as long as uniform wet coating can be carried out by the method. For example, it is possible to employ any of the methods such as a capillary coating method, a spin coating method, a slit die coating method, a spray coating method, a dip coating method, a roll coating method, a screen printing method, a flexo printing method, a bar coater method, a gravure coater method, or a die coater method. The heat resistant layer 4 has a thickness which can be controlled by adjusting (i) a thickness of a coating wet film and (ii) a solid-content concentration in the coating solution.

Note that it is possible to use a resin film, a metal belt, a metal drum, or the like as a support with which the porous film 5 is fixed or transferred in coating.

As described above, it is possible to produce the separator 12 (heat resistant separator) in which the heat resistant layer 4 is laminated on the porous film 5. The separator thus produced is wound around a separator core (core) having, for example, a cylindrical shape. Note that a subject to be produced by the above production method is not limited to the heat resistant separator. The above production method does not necessarily include the coating step. In a case where the method includes no coating step, the subject to be produced is a separator including no heat resistant layer.

Embodiment 1

The heat resistant separator or the separator including no heat resistant layer (hereinafter, also referred to as a "separator" and a "nonaqueous electrolyte secondary battery separator") preferably has a width (hereinafter, referred to as "product width") suitable for application products such as the lithium-ion secondary battery 1. However, for improving productivity, the separator is produced so as to have a width that is equal to or larger than a product width. This is referred to as a separator original sheet. After the separator original sheet is once produced, the separator original sheet is cut (slit) by the slitting apparatus so that a "separator width" (which means a length in a direction substantially perpendicular to a lengthwise direction and a thickness direction) of the separator original sheet becomes the product width, and thus a long separator sheet is obtained.

In the following descriptions, a wide separator which has not yet been slit is referred to as "separator original sheet", and a separator which has been slit so as to have a separator width that is the product width is particularly referred to as "long separator sheet". Note that "slitting" means to slit the separator original sheet in the lengthwise direction (i.e., a flow direction of the film during production; MD: machine direction), and that "cutting" means to cut the long separator sheet in a transverse direction (TD). The "transverse direction (TD)" means a direction which is substantially perpendicular to the lengthwise direction (MD) and the thickness direction of the long separator sheet.

(Porous Separator Roll)

(a) of FIG. 4 is a schematic view illustrating a configuration of a slitting apparatus 6 which includes a cutting device 7. (b) of FIG. 4 is a view illustrating a state in which an original sheet 12O of a porous separator is slit into long porous separator sheets 12a and 12b by the slitting apparatus 6.

Embodiment 1 exemplifies the porous separator original sheet 12O in which a wholly aromatic polyamide (aramid resin layer) as the heat resistant layer 4 is laminated on one surface of the porous film 5, as illustrated in FIG. 3. Note, however, that Embodiment 1 is not limited to this, and the porous separator original sheet 12O can be a porous film 5 on which no heat resistant layer 4 is laminated or can be a sheet in which heat resistant layers 4 are laminated on both surfaces of the porous film 5. Furthermore, the porous separator original sheet 12O can include a porous layer such as an adhesive layer or a protective layer instead of the heat resistant layer 4.

As illustrated in (a) of FIG. 4, the slitting apparatus 6 includes a wind-off roller 63 which is rotatably supported and has a cylindrical shape, rollers 64, 65, 68U, 68L, 69U, and 69L, a first touch roller 81U, a second touch roller 81L, a first arm 82U, a second arm 82L, a first take-up assisting roller 83U, a second take-up assisting roller 83L, a first wind-up roller 70U, a second wind-up roller 70L, and the cutting device 7.

In the slitting apparatus 6, a cylindrical core c is attached onto the wind-off roller 63, and the porous separator original sheet 12O is wound on the core c. The porous separator original sheet 12O is wound off from the core c along a route U or L. In a case where the porous separator original sheet 12O is to be transferred while a surface A of the porous separator original sheet 12O serves as an upper surface, the porous separator original sheet 12O is wound off along the route L. Whereas, in a case where the porous separator original sheet 12O is to be transferred while a surface B of the porous separator original sheet 12O serves as an upper surface, the porous separator original sheet 12O is wound off along the route U. Note that, in Embodiment 1, the porous separator original sheet 12O is transferred while the surface A serves as an upper surface, and therefore the porous separator original sheet 12O is wound off along the route L.

In Embodiment 1, the surface A is a surface of the porous film 5 which surface is opposite to a surface making contact with the heat resistant layer 4, and the surface B is a surface of the heat resistant layer 4 which surface is opposite to a surface making contact with the porous film 5.

The porous separator original sheet 12O which has been thus wound off is transferred to the cutting device 7 via the roller 64 and the roller 65, and is then slit into long porous separator sheets 12a and 12b by the cutting device 7 (see (a) and (b) of FIG. 4).

As illustrated in (a) of FIG. 4, among the plurality of long porous separator sheets 12a and 12b which have been slit by the cutting device 7, each of the long porous separator sheets 12a is transferred via the roller 68U, the roller 69U, and the first take-up assisting roller 83U, and is then wound on a cylindrical core u that is attached onto the first wind-up roller 70U. Moreover, each of the long porous separator sheets 12b among the plurality of long porous separator sheets 12a and 12b is transferred via the roller 68L, the roller 69L, and the second take-up assisting roller 83L, and is then wound on a cylindrical core 1 that is attached onto the second wind-up roller 70L. Note that the long porous separator sheets 12a and 12b which have been wound in rolls around the cores u and 1 are referred to as porous separator rolls 12U and 12L.

Here, the cores u and 1 normally each have a mass of 250 g to 800 g. Each side surface of the cores u and 1 normally has an area of 10 cm$^2$ to 80 cm$^2$.

(Separator Core (Core))

FIG. 5 illustrates respective side surface shapes of (i) the cores u and 1, whose side surfaces do not a depression, and (ii) the cores u1 and u2, which include a side surface having a depression. FIG. 5 also illustrates respective cases where (i) the cores u and 1 are stacked, (ii) the cores u1 and 1 are stacked, and (iii) the cores u2 and 1 are stacked, respective side surfaces of the cores being in mutual contact in each case.

FIG. 6 provides diagrams illustrating examples of depressions which can be provided in cores u', u'', u''', u'''', u''''', and u''''''.

(a) of FIG. 5 illustrates respective side surfaces of the cores u and 1, which are identical. Specifically, (a) of FIG. 5 illustrates the side surfaces which face each other when the cores u and 1 are stacked such that the respective side surfaces are in mutual contact.

As is illustrated, the cores u and 1 are each a separator core, made from ABS, which includes (i) an inner ring 30, (ii) an outer ring 31, and (iii) eight ribs 29 which connect the inner ring 30 and the outer ring 31 and are perpendicular to the inner ring 30 and the outer ring 31. The ribs 29, the inner ring 30, and the outer ring 31 each have the same width as measured in a direction of a stacking axis C. The stacking axis C is an axis that passes through the centers of side surfaces of the cores u and 1 in a case where the cores u and 1 are stacked such that their respective side surfaces completely overlap each other. In other words, in each of the cores u and 1, the ribs 29, the inner ring 30, and the outer ring 31 all have the same width as measured in a direction of depth in the drawing.

Note that the cores u and 1 are not limited to being made from ABS resin. A material used for the cores u and 1 normally includes a resin such as ABS resin, polyethylene resin, polypropylene resin, polystyrene resin, or vinyl chloride resin. The material preferably includes ABS resin. The material used for the cores u and 1 is preferably not metal, paper, or a fluorocarbon resin.

In Embodiment 1, the cores u and 1 each have dimensions as follows. The ribs 29 each have a thickness of 5.5 mm and a length of 26 mm. The inner ring 30 has a thickness of 6 mm, an outer diameter of 82 mm, and an inner diameter of 76 mm. The outer ring 31 has a thickness of 6 mm, an outer diameter of 152 mm, and an inner diameter of 146 mm. Both side surfaces of the inner ring 30 have been subjected to C1 beveling inward, such that the side surfaces of the inner ring 30 each have a width of 5 mm. Note, however, that these dimensions are merely examples and are non-limiting.

(b) of FIG. 5 illustrates a core stack S1, in which a side surface of the core u completely overlaps with a side surface of the core 1.

(c) of FIG. 5 illustrates respective side surfaces of the cores u1 and 1 which side surfaces face each other when the cores u1 and 1 are stacked such that their respective side surfaces are in mutual contact.

The core u1 differs from the core u as illustrated in (a) of FIG. 5 in that the former has a depression 20 in one side surface thereof. With regards to the various dimensions of the ribs 29, the inner ring 30, and the outer ring 31, the core u1 and the core u are identical.

Embodiment 1 exemplifies a case in which the depression 20 has been provided in only one of the two side surfaces of the core u1. This example is non-limiting, however. For example, a single side surface can have a plurality of depressions 20, each of the two side surfaces can have a single depression 20, or each of the two side surfaces can have a plurality of depressions 20.

In a case where a plurality of depressions 20 are provided, the plurality of depressions 20 may be provided such that, when viewed from above, in a case where any one of the plurality of depressions 20 is rotated around the stacking axis C (i.e., around the center of side surfaces overlapping with each other), the one of the plurality of depressions 20 which is rotated overlaps with each other one of the plurality of depressions 20. The plurality of depressions 20 may alternatively be provided in an arrangement differing from the above.

(d) of FIG. 5 illustrates a core stack S2, in which a side surface of the core u1 completely overlaps with a side surface of the core 1.

(e) of FIG. 5 illustrates respective side surfaces of the cores u2 and 1 which side surfaces face each other when the cores u2 and 1 are stacked such that their respective side surfaces are in mutual contact.

The core u2 differs from the core u1 as illustrated in (c) of FIG. 5 in that the former has two depressions 20 in one side surface thereof. With regards to the various dimensions of the ribs 29, the inner ring 30, and the outer ring 31, the core u2 and the core u1 are identical.

Embodiment 1 exemplifies a case in which two depressions 20 have been provided in only one of the two side surfaces of the core u2. This example is non-limiting, however. For example, a single side surface can have three or more depressions 20, or each of the two side surfaces can have a plurality of depressions 20.

In the core u2, the plurality of depressions 20 are provided such that, when viewed from above, in a case where any one of the plurality of depressions 20 is rotated around the stacking axis C (i.e., around the center of side surfaces overlapping with each other), the one of the plurality of depressions 20 which is rotated overlaps with each other one of the plurality of depressions 20. This is a non-limiting example, however. The plurality of depressions 20 may alternatively be provided such that, when viewed from above, in a case where any one of the plurality of depressions 20 is rotated around the stacking axis C (i.e., around the center of side surfaces overlapping with each other), the one of the plurality of depressions 20 which is rotated does not overlap with each other one of the plurality of depressions 20.

(f) of FIG. 5 illustrates a core stack S3, in which a side surface of the core u2 completely overlaps with a side surface of the core 1.

(a) of FIG. 6 illustrates a case where a depression 20' has been provided to a rib 29' of the core u'. The depression 20' is preferably provided, as illustrated, at a position on the rib 29' which is not less than 0.5 mm away from each end part of the rib 29' connecting the rib 29' to the inner ring 30 and the outer ring 31. Note that the rib 29' has the same dimensions as the ribs 29.

(b) of FIG. 6 illustrates a case where a depression 20" has been provided to a rib 29" of the core u". The depression 20'" is preferably provided, as illustrated, at a position on the rib 29" which is not less than 0.5 mm away from each end part of the rib 29" connecting the rib 29" to the inner ring 30 and the outer ring 31 (that is, not less than 0.5 mm away from both an outer ring side and an inner ring side of the rib 29"). The depression 20" is preferably provided so as to be not less than 0.5 mm away from each end of the rib 29" in the width direction of the rib 29" as well. Providing the depression 20" so as to be separated from both ends of the rib 29" in the width direction of the rib 29" forms walls 29a" and 29b" on both sides of the rib 29" in the width direction of the rib 29".

In the core u" illustrated in (b) of FIG. 6, the walls 29a" and 29b" are each provided to a respective one of two sides of the rib 29" in the width direction. This configuration is non-limiting, however, and a configuration may be employed in which (i) a wall is provided to only one side of the rib 29" in the width direction, or (ii) neither side of the rib 29" in the width direction has a wall, as illustrated in (a) of FIG. 6.

In a case where a wall is provided to one or both sides of a rib in the width direction thereof, the wall preferably has a thickness of not less than 0.5 mm.

Note that a length of the depression 20" is not particularly limited, but the depression 20" is preferably provided so as to be not less than 0.5 mm away from each end of the rib at which the rib connects to the inner ring 30 or the outer ring 31.

Note that the rib 29" has the same dimensions as the ribs 29.

Embodiment 1 exemplifies a case where the depressions 20, 20', and 20" are provided to a respective side surface of the ribs 29, 29', and 29", respectively. This example is non-limiting, however, and the depression may be provided to a side surface of the inner ring 30 or to a side surface of the outer ring 31.

(c) of FIG. 6 illustrates a case where a depression 20'" is provided to a side surface of an outer ring 31' of a core u'", and (d) of FIG. 6 illustrates a case where a depression 20"" is provided to a side surface of an outer ring 31" of a core u"".

The depression 20'" is preferably provided not less than 0.5 mm away from an outer ring outer peripheral surface of the outer ring 31', as illustrated in (c) of FIG. 6.

The depression 20"" may be provided not less than 0.5 mm away from (i) an outer ring outer peripheral surface of the outer ring 31" and (ii) an outer ring inner peripheral surface of the outer ring 31", as illustrated in (d) of FIG. 6. Providing the depression 20"" in this manner makes it possible to form walls 31a" and 31b" in the width direction of the outer ring 31".

In a case where a wall is provided to one or both sides of an outer ring in the width direction thereof as illustrated in (c) and (d) of FIG. 6, the wall preferably has a thickness of not less than 0.5 mm.

Providing the depressions 20'" and 20"" in this manner makes it possible to prevent the shape of the depressions 20'" or 20"" from being transferred to the long porous separator sheet 12a or 12b when the long porous separator sheet 12a or 12b is wound. In a case where a depression is provided to a side surface of the outer ring 31' or 31" in a manner so as to be connected to the outer ring outer peripheral surface, the shape of the depression will be transferred to the long porous separator sheet 12a or 12b when the long porous separator sheet 12a or 12b is wound.

The depressions 20'" and 20"" are not particularly limited with regards to the respective lengths thereof. The outer rings 31' and 31" have the same dimensions as the outer ring 31.

(e) of FIG. 6 illustrates a case where a depression 20'"" is provided to a side surface of an inner ring 30' of a core u'"", and (f) of FIG. 6 illustrates a case where a depression 20"""" is provided to a side surface of an inner ring 30" of a core u"""".

The depression 20'"" is preferably provided not less than 0.5 mm away from an inner ring inner peripheral surface of the inner ring 30', as illustrated in (e) of FIG. 6.

The depression 20"""" may be provided not less than 0.5 mm away from (i) an inner ring outer peripheral surface of the inner ring 30" and (ii) an inner ring inner peripheral surface of the inner ring 30", as illustrated in (f) of FIG. 6. Providing the depression 20"""" in this manner makes it possible to form walls 30a" and 30b" in the width direction of the inner ring 30".

In a case where a wall is provided to one or both sides of an inner ring in the width direction thereof as illustrated in (e) and (f) of FIG. 6, the wall preferably has a thickness of not less than 0.5 mm.

The depressions 20'"" and 20"""" are not particularly limited with regards to the respective lengths thereof. The inner rings 30' and 30" have the same dimensions as the inner ring 30.

FIG. 6 exemplifies a case where only one depression is provided to a side surface of a core. This example is non-limiting, however, and a plurality of depressions may be provided to a side surface of a core. Note that in a case where a plurality of depressions are provided to a side surface of a core, a configuration can be employed where the plurality of depressions is provided to only one from the group consisting of (i) the ribs, (ii) the inner ring, and (iii) the outer ring, or, alternatively, where the plurality of depressions is provided to two or more from the group consisting of (i) the ribs (ii) the inner ring and (iii) the outer ring.

(b) of FIG. 5 illustrates the core stack S1, in which the cores u and 1, having no depressions 20, are stacked such that respective side surfaces of the cores u and 1 are in mutual contact. In the core stack S1, respective side surfaces of the cores u and 1, which side surfaces face each other, are in mutual contact across the total area of each side surface.

(d) of FIG. 5 illustrates the core stack S2, in which the core u1, which has a depression 20, and the core 1 are stacked such that respective side surfaces of the cores u1 and 1 are in mutual contact. The depression 20 provided to the side surface of the core u1 corresponds to about 3.9% of the total area of the side surface of the core u1. As such, in the core stack S2, respective side surfaces of the cores u1 and 1, which side surfaces face each other, are in mutual contact across 96.1% of the total area of each side surface.

(f) of FIG. 5 illustrates the core stack S3, in which the core u2, which has two depressions 20, and the core 1 are stacked such that respective side surfaces of the cores u2 and 1 are in mutual contact. The depressions 20 provided to the side surface of the core u2 correspond to about 7.8% of the total area of the side surface of the core u2. As such, in the core stack S3, respective side surfaces of the cores u2 and 1, which side surfaces face each other, are in mutual contact across 92.2% of the total area of each side surface.

Adjusting the size and number of the depression(s) 20 provided to the cores u1 and u2 makes it possible to alter (i)

an area of contact between side surfaces of the cores u1 and 1 and (ii) an area of contact between side surfaces of the cores u2 and 1.

The depression 20 has a depth which is normally not less than 0.1 mm and which can be set to be 0.3 mm or greater. The depth of the depression 20 is normally not more than 3 mm and can be set to be not more than 1 mm. Setting the depth of the depression 20 to be not less than 0.1 mm makes it possible to more reliably prevent cores from sticking to each other even in a case where, after the cores are cleaned, the cores are stacked such that their respective side surfaces are in mutual contact. Setting the depth of the depression 20 to be not more than 3 mm makes it possible to adequately maintain the strength of a core and expedite drying of the core after cleaning of the core. A depth of not more than 3 mm also makes it possible to prevent a foreign object from getting into the depression 20 and adhering to the core.

The core stacks S1, S2, and S3 illustrated in FIG. 5 exemplify cases in which only one of the two cores constituting a core stack includes a depression 20. This configuration is non-limiting, however, and both cores constituting a stack may include a depression 20.

Furthermore, in Embodiment 1, the side surfaces of cores are processed so as to have an arithmetic mean roughness Ra of 0.1 μm to 1.0 μm, but this configuration is non-limiting. The effects of the side surfaces of cores having a roughness of approximately 0.1 μm to 1.0 μm was not considered in calculating (i) the ratio of the total area of a side surface occupied by a depression and (ii) the ratio of an area of contact to the total area of a side surface.

Using the cores u1 and u2, which include a side surface having a depression 20, makes it possible to appropriately decrease an area of contact between side surfaces of cores which are stacked such that the side surfaces are in mutual contact. This makes it possible, in a case where cores still wet after cleaning are stacked on each other, to prevent cores from sticking together while also preventing the cores from slipping laterally and falling down.

As such, using the cores u1 and u2, which include a side surface having a depression 20, makes it possible to prevent damage to a core caused by, for example, the core falling.

(Slippage Testing and Vertical Separation Testing of Stacked Separator Cores (Cores))

FIG. 7 provides diagrams for explaining a method of slippage testing of stacked cores.

As is illustrated, slippage testing of stacked cores utilizes a protractor 22, a flat member 23, cushioning 24, and the cores u1 and 1.

Discussed here is an example in which slippage testing is carried out using the core u1 stacked on the core 1.

First, the respective side surfaces of the cores u1 and 1 were wetted evenly with water. The core 1 was then fixed to the flat member 23, and the core u1 was stacked on the core 1, as illustrated in (a) and (c) of FIG. 7. In stacking the core u1 on the core 1, a side surface of the core u1 which side surface has the depression 20 was in contact with a side surface of the core 1 such that when viewed from above, the eight ribs 29 of the core u1 completely overlapped with the eight ribs 29 of the core 1.

Thereafter, the flat member 23 on which the core 1 and core u1 were stacked was caused to increasingly incline at a rate of 1 degree per second. The protractor 22 was used to measure the angle at a point in time at which the core u1 slipped and fell onto the cushioning 24, and this angle was considered to be an angle of slippage commencement (see (b) and (d) of FIG. 7).

Slippage testing of stacked cores was carried out 10 times (N=10) for each sample, and an average of the values obtained was used as the angle of slippage commencement.

FIG. 8 provides diagrams for explaining a method for vertical separation testing of stacked cores.

Discussed here is an example in which vertical separation testing is carried out using the core stack S2, which consists of the core u1 stacked on the core 1.

First, the core 1 was fixed to a supporting surface, and the side surfaces of the core u1 and 1 were wetted evenly. In stacking the core u1 on the core 1, a side surface of the core u1 which side surface has the depression 20 was in contact with a side surface of the core 1, as illustrated in (a) of FIG. 8, such that when viewed from above, the eight ribs 29 of the core u1 completely overlapped with the eight ribs 29 of the core 1.

Thereafter, a "Tensilon Universal Material Testing Machine" (manufactured by Orientec, model RTG-1310) was used to vertically lift the core u1 stacked on top of the core 1, at a speed of 50 mm/min. As shown in (b) of FIG. 8, vertical separation strength was measured as a difference between (i) a value of peak stress and (ii) a value of stress after stress stabilized subsequent to separation of the core u1 from the core 1

Vertical separation testing of stacked cores was carried out 5 times (N=5) for each sample, and an average of values obtained was used as the vertical separation strength.

FIG. 9 indicates results of slippage testing and vertical separation testing carried out on various samples in which the area of the depression differed (that is, in which the area of contact differed).

As is indicated in FIG. 9, in the case of sample 1 (a comparative example), in which the depression area ratio was 0% (that is, in which the area of contact between side surfaces of the stacked cores was 100%), the angle of slippage commencement was 41.7 degrees, and the vertical separation strength was 3.53 N.

Note that, here, "depression area ratio" refers to a ratio, of the total area of a side surface of a core provided with a depression (that is, the area of a side surface of each of the ribs+the area of a side surface of the inner ring+the area of a side surface of the outer ring), which is occupied by a depression(s). In each sample indicated in FIG. 9, a side surface of a core having a depression was placed into contact with a side surface of the other core which did not have a depression. The depression area ratio was calculated as the difference between (i) the aforementioned total area and (ii) the area of contact between side surfaces of the stacked cores.

In the case of sample 2, in which the depression area ratio was 3.9% (that is, in which the area of contact between side surfaces of the stacked cores was 96.1%), the angle of slippage commencement was 35.1 degrees, and the vertical separation strength was 3.06 N. In the case of sample 3, in which the depression area ratio was 7.7% (that is, in which the area of contact between side surfaces of the stacked cores was 92.3%), the angle of slippage commencement was 34.9 degrees, and the vertical separation strength was 2.87 N. In the case of sample 4, in which the depression area ratio was 14.8% (that is, in which the area of contact between side surfaces of the stacked cores was 85.2%), the angle of slippage commencement was 29.9 degrees, and the vertical separation strength was 2.02 N. In the case of sample 5, in which the depression area ratio was 29.7% (that is, in which the area of contact between side surfaces of the stacked cores was 70.3%), the angle of slippage commencement was 26.0 degrees, and the vertical separation strength was 1.39 N.

In normal storage of stacked separator cores (cores), the stacked cores are typically not inclined at an angle of 26.0 degrees or more with respect to a level surface. As such, the value of the angle of slippage commencement (26.0 degrees) seen in sample 5 is sufficient in terms of preventing cores, which have been stacked while wet with cleaning liquid after cleaning, from slipping laterally and falling down. Furthermore, such a value is sufficient in terms of preventing cores from slipping laterally in a case where core cleaning is performed in a continuous manner using a belt conveyor or the like.

With regard to vertical separation strength, sample 1, serving as a comparative example, had a large vertical separation strength of 3.53 N, which signifies that an upper and lower core which are stuck together cannot easily separate. In such a case, there is the risk that when the upper core is lifted up, the lower core may be lifted with it and then subsequently separate and fall.

However, with a vertical separation strength on the level of that of samples 2 and 3 (3.06 N and 2.87 N, respectively), an upper and lower core which are stuck together can separate relatively easily when the upper core is lifted up. This makes it possible to prevent the risk, seen with sample 1, of the lower core being lifted together with the upper core and then subsequently separating and falling.

Embodiment 2

Embodiment 2 differs from Embodiment 1 in that, in the former, a depression 25 provided to a side surface of the core u1 includes an imprinted portion 26.

(a) of FIG. 10 illustrates the core u1 having a side surface in which the depression 25 is provided, the depression 25 including the imprinted portion 26. (b) of FIG. 10 illustrates the depression 25 including the imprinted portion 26.

As illustrated in (a) and (b) of FIG. 10, the imprinted portion 26 is provided to a substantially central portion of the depression 25 and indicates various information to a person handling the core. The imprinted portion 26 can include, for example, letters, numbers, and symbols.

In a case where the core u1 includes a plurality of depressions, the plurality of depressions can include one or more depressions having an imprinted portion. In a case where two or more depressions include an imprinted portion, each imprinted portion can be an imprint indicating differing information.

Note that a depression can be formed by an imprint itself.

The imprinted portion 26 can have a height that is level with a part of the side surface of the core u1 other than the depression 25, or can have a height that is lower than a part of the side surface of the core u1 other than the depression 25.

Embodiment 3

Embodiment 3 differs from Embodiments 1 and 2 in that, in the former, a depression is provided in a side surface of a core by adjusting respective widths of the ribs 29, inner ring 30, and outer ring 31 constituting the core, the widths being measured in the direction of the stacking axis C.

(a) and (b) of FIG. 11 illustrate an example of the core u used in Embodiments 1 and 2, in which the ribs 29, the inner ring 30, and the outer ring 31 each have the same width as measured in the direction of the stacking axis C. (c) of FIG. 11 illustrates an example of a core u3 in which the each of the outer ring 31 and the ribs 29 is smaller in width, as measured in the direction of the stacking axis C, than the inner ring 30. (d) of FIG. 11 illustrates an example of a core u4 in which each of the inner ring 30 and the ribs 29 is smaller in width, as measured in the direction of the stacking axis C, than the outer ring 31. (e) of FIG. 11 illustrates an example of a core u5 in which the inner ring 30 is smaller in width, as measured in the direction of the stacking axis C, than each of the ribs 29 and the outer ring 31. (f) of FIG. 11 illustrates an example of a core u6 in which the outer ring 31 is smaller in width, as measured in the direction of the stacking axis C, than each of the ribs 29 and the inner ring 30. (g) of FIG. 11 illustrates an example of a core u7 in which each of the inner ring 30 and the outer ring 31 is smaller in width, as measured in the direction of the stacking axis C, than each of the ribs 29. (h) of FIG. 11 illustrates an example of a core u8 in which each of the ribs 29 is smaller in width, as measured in the direction of the stacking axis C, than each of inner ring 30 and the outer ring 31. (i) of FIG. 11 illustrates an example of a core u9 in which a portion of the ribs 29 is smaller in width, as measured in the direction of the stacking axis C, than each of inner ring 30, the outer ring 31, and a remaining portion of the ribs 29.

The core u3 of (c) of FIG. 11 has a side surface in which a depression 32 is provided. The depression 32 is constituted by a portion of the core u3 in which portion each of the ribs 29 and the outer ring 31 is smaller in width, as measured in the direction of the stacking axis C, than the inner ring 30. The core u4 of (d) of FIG. 11 has a side surface in which a depression 33 is provided. The depression 33 is constituted by a portion of the core u4 in which portion each of the ribs 29 and the inner ring 30 is smaller in width, as measured in the direction of the stacking axis C, than the outer ring 31. The core u5 of (e) of FIG. 11 has a side surface in which a depression 34 is provided. The depression 34 is constituted by a portion of the core u5 in which portion the inner ring 30 is smaller in width, as measured in the direction of the stacking axis C, than each of the ribs 29 and the outer ring 31. The core u6 of (f) of FIG. 11 has a side surface in which a depression 35 is provided. The depression 35 is constituted by a portion of the core u6 in which portion the outer ring 31 is smaller in width, as measured in the direction of the stacking axis C, than each of the ribs 29 and the inner ring 30. The core u7 of (g) of FIG. 11 has a side surface in which a depression 36 is provided. The depression 36 is constituted by a portion of the core u7 in which portion each of the inner ring 30 and the outer ring 31 is smaller in width, as measured in the direction of the stacking axis C, than each of the ribs 29. The core u8 of (h) of FIG. 11 has a side surface in which a depression 37 is provided. The depression 37 is constituted by a portion of the core u8 in which portion each of the ribs 29 is smaller in width, as measured in the direction of the stacking axis C, than each of the inner ring 30 and the outer ring 31. The core u9 of (i) of FIG. 11 has a side surface in which a depression 38 is provided. The depression 38 is constituted by a portion of the core u9 in which portion a portion of the ribs 29 is smaller in width, as measured in the direction of the stacking axis C, than each of a remaining portion of the ribs 29, the inner ring 30 and the outer ring 31.

Discussed in Embodiment 3 are exemplary cases in which each of the depressions 32 to 37 is rotationally symmetrical, at all angles of rotation, with respect to the stacking axis C. That is, each of the depressions 32 to 37 has a shape that is identical at all angles of rotation around the stacking axis C. The depressions 32 to 37 are not, however, limited to such a configuration.

Furthermore, discussed in Embodiment 3 are exemplary cases in which the depressions 32 to 38 are formed. This configuration is non-limiting, however. A depression need only be formed such that one or two from the group consisting of (i) the ribs 29, (ii) the inner ring 30, and (iii) the outer ring 31 has/have a smaller width, as measured in the direction of the stacking axis C, than remaining ones of the (i) the ribs 29, (ii) the inner ring 30, and (iii) the outer ring 31.

A depression preferably has a size and shape such that, in a case where two cores are stacked such that respective side surfaces thereof are in contact, not less than 75% and not more than 97% of the total area of a side surface of one of the cores is in contact with a facing side surface of the other one of the cores (the total area being equal to the area of a side surface of each of the ribs+the area of a side surface of the inner ring+the area of a side surface of the outer ring). The above range is more preferably not less than 85% and not more than 97%.

A depression(s) provided to a side surface of a core preferably has/have an area occupying not less than 3% and not more than 25% of the total area of the side surface (the total area being equal to the area of a side surface of each of the ribs+the area of a side surface of the inner ring+the area of a side surface of the outer ring). The above range is more preferably not less than 3% and not more than 15%.

In the case of the cores u3 to u9, the ratio of area occupied by the depressions 32 to 38 can be adjusted by adjusting the respective thicknesses and lengths of the ribs, the inner ring, and the outer ring.

[Recapitulation]

A separator core in accordance with Aspect 1 of the present invention is a separator core around which a non-aqueous electrolyte secondary battery separator is to be wound, in which: a side surface of the separator core has a depression.

With the above configuration, a side surface of the separator core has a depression. This makes it possible to prevent separator cores from sticking to each other, even in a case where, for example, after cleaning of the separator cores, the separator cores are stacked such that respective side surfaces thereof are in mutual contact.

In Aspect 2 of the present invention, the separator core of Aspect 1 can be configured such that: the depression includes an imprinted portion.

With the above configuration, the depression includes an imprinted portion. This makes it possible indicate various information to a person handling the separator core.

In Aspect 3 of the present invention, the separator core of Aspect 1 can be configured such that: each of an outer ring, a rib, and an inner ring constituting the separator core is identical in width, as measured in a direction of a stacking axis which passes through a center of the side surface of the separator core; and the depression is provided to at least one of (i) a side surface of the outer ring, (ii) a side surface of the rib, and (iii) a side surface of the inner ring.

With the above configuration, portions of the side surface of the separator core, other than the depression, are flat. This makes it possible to stably stack separator cores without wobbling thereof.

Furthermore, the depression is provided to at least one of (i) a side surface of the outer ring, (ii) a side surface of the rib, and (iii) a side surface of the inner ring. This makes it possible to prevent separator cores from sticking to each other.

In Aspect 4 of the present invention, the separator core of Aspect 3 can be configured such that: the depression includes an imprinted portion.

With the above configuration, the depression includes an imprinted portion. This makes it possible indicate various information to a person handling the separator core.

In Aspect 5 of the present invention, the separator core of Aspect 3 or 4 can be configured such that: the depression is one of a plurality of depressions which are provided to at least one of two side surfaces of the separator core, the plurality of depressions being provided such that, when viewed from above, in a case where any one of the plurality of depressions is rotated around the stacking axis, the one of the plurality of depressions which is rotated overlaps with each other one of the plurality of depressions.

With the above configuration, a plurality of depressions are provided in a symmetrical manner. This makes it possible to evenly prevent separator cores from sticking to each other.

In Aspect 6 of the present invention, the separator core of Aspect 3 or 4 can be configured such that: the depression is one of a plurality of depressions which are provided to at least one of two side surfaces of the separator core, the plurality of depressions being provided such that, when viewed from above, in a case where any one of the plurality of depressions is rotated around the stacking axis, the one of the plurality of depressions which is rotated does not overlap with each other one of the plurality of depressions.

With the above configuration, a plurality of depressions are provided in an asymmetrical manner. This makes it possible to evenly prevent separator cores from sticking to each other.

In Aspect 7 of the present invention, the separator core of any one of Aspects 1 through 4 can be configured such that: the depression is rotationally symmetrical, at all angles of rotation, with respect to a stacking axis which passes through a center of the side surface of the separator core.

With the above configuration, the depression is rotationally symmetrical, at all angles of rotation, with respect to a stacking axis which passes through a center of the side surface of the separator core. This effectively prevents separator cores from sticking to each other.

In Aspect 8 of the present invention, the separator core of Aspect 1 can be configured such that: the separator core is constituted by an outer ring, a rib, and an inner ring; and the depression is constituted by a portion of the separator core in which portion one or two of (i) the outer ring, (ii) the rib, and (iii) the inner ring is/are smaller in width, as measured in a direction of a stacking axis which passes through a center of the side surface of the separator core, than each remaining one of (i) the outer ring, (ii) the rib, and (iii) the inner ring.

With the above configuration, the depression has an area that is larger in comparison to a case where the depression is provided to at least one of (i) a side surface of the outer ring, (ii) a side surface of the rib, and (iii) a side surface of the inner ring. This makes it possible to reduce an area of contact when separator cores are stacked and therefore effectively prevents separator cores from sticking to each other when stacked.

Furthermore, the depression having a larger area effectively reduces material costs.

In Aspect 9 of the present invention, the separator core of Aspect 8 can be configured such that: the depression is constituted by a portion of the separator core in which portion the inner ring is smaller in width, as measured in the direction of the stacking axis, than the outer ring.

With the above configuration, in a case where separator cores are stacked, their respective outer rings will be in mutual contact. In comparison to a configuration in which the outer ring is smaller in width, as measured in the direction of the stacking axis, than the inner ring, this configuration makes it possible to more stably stack separator cores without wobbling thereof.

The above configuration also makes it easy to set a separator core onto a roller or the like.

In Aspect 10 of the present invention, the separator core of Aspect 8 can be configured such that: the depression is constituted by a portion of the separator core in which portion the outer ring is smaller in width, as measured in the direction of the stacking axis, than the inner ring.

The above configuration makes it possible to prevent separator cores from sticking to each other when stacked.

The above configuration also makes it easy to protect an end face of a nonaqueous electrolyte secondary battery separator when, for example, setting a separator core onto a roller or when stacking separator cores.

In Aspect 11 of the present invention, the separator core of Aspect 8 can be configured such that: the rib includes a plurality of ribs; and the depression is constituted by a portion of the separator core in which portion each of the outer ring and the inner ring is smaller in width, as measured in the direction of the stacking axis, than each of the plurality of ribs.

With the above configuration the plurality of ribs protrude. This effectively prevents separator cores from sticking to each other when stacked.

In Aspect 12 of the present invention, the separator core of Aspect 8 can be configured such that: the rib includes a plurality of ribs; and the depression is constituted by a portion of the separator core in which portion each of the plurality of ribs is smaller in width, as measured in the direction of the stacking axis, than each of the outer ring and the inner ring.

With the above configuration the plurality of ribs are recessed. This effectively prevents separator cores from sticking to each other when stacked.

In Aspect 13 of the present invention, the separator core of any one of Aspects 1 through 12 is preferably configured such that: the depression has a depth of not less than 0.1 mm.

The above configuration makes it possible to prevent separator cores from sticking to each other, even in a case where, for example, after cleaning of the separator cores, the separator cores are stacked such that respective side surfaces thereof are in mutual contact.

In Aspect 14 of the present invention, the separator core of any one of Aspects 1 through 13 is preferably configured such that: the depression occupies not less than 3% and not more than 25% of a total area of the side surface having the depression.

With the above configuration, the depression occupies not less than 3% and not more than 25% of a total area of the side surface having the depression. This makes it possible to prevent separator cores from sticking to each other, even in a case where, for example, after cleaning of the separator cores, the separator cores are stacked such that respective side surfaces thereof are in mutual contact. This also makes it possible to separator cores which have been stacked while still wet after cleaning from slipping laterally and falling down.

A separator roll in accordance with Aspect 15 of the present invention can be configured so as to include: a separator core of any one of Aspects 1 through 14; and a nonaqueous electrolyte secondary battery separator wound around the separator core.

The above configuration uses a separator core in which damage is unlikely to occur from a fall caused by, for example, separator cores sticking to each other. This makes it possible to prevent winding defects such as wrinkling of a long separator sheet wound around the separator core.

[Additional Remarks]

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

INDUSTRIAL APPLICABILITY

An embodiment of the present invention can be used as separator core and a separator roll.

REFERENCE SIGNS LIST

1 Lithium-ion secondary battery
12a Long porous separator sheet
12b Long porous separator sheet
12U Porous separator roll
12L Porous separator roll
12O Porous separator original sheet
u, 1 Core (separator core)
u1 through u9 Core (separator core)
u', u", u'" Core (separator core)
u"" Core (separator core)
u""' Core (separator core)
u""" Core (separator core)
20 Depression
20' Depression
20" Depression
20'" Depression
20"" Depression
20'"' Depression
20"""' Depression
21 Depression
25 Depression
26 Imprinted portion
29 Rib
29' Rib
29" Rib
30 Inner ring
30' Inner ring
30" Inner ring
31 Outer ring
31' Outer ring
31" Outer ring
32 through 38 Depression

The invention claimed is:

1. A separator core around which a nonaqueous electrolyte secondary battery separator is to be wound, wherein:
a plurality of depressions are provided to at least one of two side surfaces of the separator core;
each of an outer ring, a rib, and an inner ring constituting the separator core is identical in width, as measured in a direction of a stacking axis which passes through respective centers of the two side surfaces of the separator core;
the plurality of depressions are provided to at least one of (i) a side surface of the outer ring, (ii) a side surface of the rib, and (ii) a side surface of the inner ring; and
the plurality of depressions are provided such that, when viewed from above, in a case where any one of the plurality of depressions is rotated around the stacking axis, the one of the plurality of depressions which is rotated does not overlap with each other one of the plurality of depressions.

2. The separator core according to claim 1, wherein at least one of the plurality of depressions includes an imprinted portion.

3. The separator core according to claim 1, wherein at least one of the plurality of depressions has a depth of not less than 0.1 mm.

4. The separator core according to claim 1, wherein for each one of the at least one of the two side surfaces of the separator core to which one or more of the plurality of depressions is provided, not less than 3% and not more than 25% of a total area of that side surface is occupied by the one or more of the plurality of depressions provided thereto.

5. A separator roll comprising: a separator core as recited in claim 1; and a nonaqueous electrolyte secondary battery separator wound around the separator core.

* * * * *